(12) United States Patent
Shyrman

(10) Patent No.: US 12,217,762 B1
(45) Date of Patent: Feb. 4, 2025

(54) SYSTEM AND METHOD FOR DETECTING SYNTHETIC SPEECH BASED ON PROSODY ANALYSIS

(71) Applicant: Corsound AI Ltd, Tel Aviv (IL)

(72) Inventor: Denys Shyrman, Dnipropetrovsk Region (UA)

(73) Assignee: CORSOUND AI LTD., Tel Aviv (IL)

( * ) Notice: Subject to any disclaimer, the term of this patent is extended or adjusted under 35 U.S.C. 154(b) by 0 days.

(21) Appl. No.: 18/735,525

(22) Filed: Jun. 6, 2024

(51) Int. Cl.
| | |
|---|---|
| G10L 13/10 | (2013.01) |
| G10L 13/047 | (2013.01) |
| G10L 17/02 | (2013.01) |
| G10L 17/04 | (2013.01) |
| G10L 17/06 | (2013.01) |
| G10L 17/26 | (2013.01) |
| G10L 25/18 | (2013.01) |

(52) U.S. Cl.
CPC ............ *G10L 17/26* (2013.01); *G10L 13/047* (2013.01); *G10L 13/10* (2013.01); *G10L 17/02* (2013.01); *G10L 17/04* (2013.01); *G10L 17/06* (2013.01); *G10L 25/18* (2013.01)

(58) Field of Classification Search
CPC ................................ G10L 13/10; G10L 17/26
See application file for complete search history.

(56) References Cited

U.S. PATENT DOCUMENTS

| | | | |
|---|---|---|---|
| 2022/0383118 A1* | 12/2022 | Nair | G06N 3/0455 |
| 2024/0194206 A1* | 6/2024 | Sokol | G10L 17/06 |

OTHER PUBLICATIONS

Attorresi, L., Salvi, D., Borrelli, C., Bestagini, P., & Tubaro, S. (2022, August). Combining automatic speaker verification and prosody analysis for synthetic speech detection. In International Conference on Pattern Recognition (pp. 247-263). Cham: Springer Nature Switzerland.*
Adding Features to Time Series Model LSTM, printed on Jun. 2, 2024.
R. Skerry-Ryan et al: Toward End-to-End Prosody Transfer for Expressive Speech Synthesis with Tacotron; arXiv:1803.09047v1 [cs.CL], Mar. 24, 2018.
Alessandro Pianese et al; Deepfake audio detection by speaker verification; arXiv:2209.14098v1 [cs.SD], Sep. 28, 2022.
Luigi Attorresi et al: Combining Automatic Speaker Verification and Prosody Analysis for Synthetic Speech Detection; arXiv:2210.17222v1 [cs.SD], Oct. 31, 2022.

* cited by examiner

*Primary Examiner* — Bryan S Blankenagel
(74) *Attorney, Agent, or Firm* — PEARL COHEN ZEDEK LATZER BARATZ LLP

(57) ABSTRACT

System and method detecting synthetic speech may include, using a processor: training a prosody extractor by: providing a training speech sample to an encoder-decoder (codec) model to generate a channel degraded speech sample; providing the channel degraded speech sample to a prosody extractor to extract a prosody embedding; providing to a speech synthesis model the prosody embedding, a codec embedding representing the codec model, speaker identity information and a text representation to generate a spectrogram of the training speech sample; and training the speech synthesis model and the prosody extractor using a loss function defined on the spectrogram generated by the speech synthesis model compared with a spectrogram of the channel degraded speech sample; and using the trained prosody extractor to detect synthetic speech.

20 Claims, 10 Drawing Sheets

SYSTEM AND METHOD FOR DETECTING SYNTHETIC SPEECH BASED ON PROSODY ANALYSIS

FIELD OF THE INVENTION

The present invention relates generally to deep fake audio samples of speech; by way of non-limiting example, a synthetic speech may be detected based on prosody analysis.

BACKGROUND

Sophisticated deep learning models for voice generation and voice cloning, e.g., generating fake speech in a voice of a real and specific person, may produce extremely realistic synthetic speech. Malicious uses of such tools are possible and likely, posing a serious threat to individuals, organizations and to society as a whole. Speaker recognition systems exist as well; however, most voice-cloning tools today succeed in replicating the speaker voice so that often the speaker recognition systems may not be able to distinguish between real and spoofed voice.

SUMMARY

According to embodiments of the invention, a computer-based system and method for detecting synthetic speech may include, using a processor: training a prosody extractor by: providing a training speech sample to an encoder-decoder (codec) model to generate a channel degraded speech sample; providing the channel degraded speech sample to a prosody extractor to generate a prosody embedding; providing to a speech synthesis model the prosody embedding, a codec embedding representing the codec model, speaker identity information and a text representation to generate a spectrogram of the training speech sample; and training the speech synthesis model and the prosody extractor using a loss function defined on the spectrogram generated by the speech synthesis model compared with a spectrogram of the channel degraded speech sample; and using the trained prosody extractor to detect synthetic speech.

According to embodiments of the invention, using the trained prosody extractor to detect synthetic speech may include: providing a reference speech sample to the trained prosody extractor to extract prosody embedding of the reference speech sample; providing an examined speech sample to the trained prosody extractor to generate a prosody embedding of examined speech sample; comparing the prosody embedding of the reference speech sample with the prosody embedding of examined speech sample; and determining whether the examined speech sample is authentic or synthetic based on the comparison.

According to embodiments of the invention, determining whether the examined speech sample is authentic or synthetic based on the comparison may include: calculating a similarity measure between prosody embedding of the examined speech sample and the prosody embedding of the reference speech sample; and validating the measure of similarity against a threshold.

According to embodiments of the invention, generating the text representation may include: providing the speech sample to a pretrained automatic speech recognition (ASR) network to output the text representation.

According to embodiments of the invention, the text representation may include a sequence of vector representations of pieces of phonemes in the training speech sample.

Embodiments of the invention may include, generating the speaker identity information by providing the speech sample to a pretrained speaker identity extractor to extract speaker identity embedding, where the speaker identity information may be the speaker identity embedding.

According to embodiments of the invention, providing the channel degraded speech sample to the prosody extractor may include providing the channel degraded speech sample to a recording device model to generate a channel and recording device degraded speech sample, and providing the channel and recording device degraded speech sample to the prosody extractor; and where training the prosody extractor may include providing a recording device embedding representing the recording device to the speech synthesis model together with the prosody embedding, the speaker identity embedding and the text representation for generating the spectrogram of the training speech sample.

According to embodiments of the invention, the speech synthesis model may be Tacotron2 model.

According to embodiments of the invention, a computer-based system and method for detecting synthetic speech may include, using a processor: training a prosody extractor by: providing a training speech sample to a recording device model to generate a recording device degraded speech sample; providing the recording device degraded speech sample to a prosody extractor to generate a prosody embedding; providing to a speech synthesis model the prosody embedding, a recording device embedding representing the recording device model, speaker identity information and a text representation to generate a spectrogram of the training speech sample; and training the speech synthesis model and the prosody extractor using a loss function defined on the spectrogram generated by the speech synthesis model compared with a spectrogram of the channel degraded speech sample; and using the trained prosody extractor to detect synthetic speech.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanying drawings. Embodiments of the invention are illustrated by way of example and not limitation in the figures of the accompanying drawings, in which like reference numerals indicate corresponding, analogous or similar elements, and in which:

Figure 1:
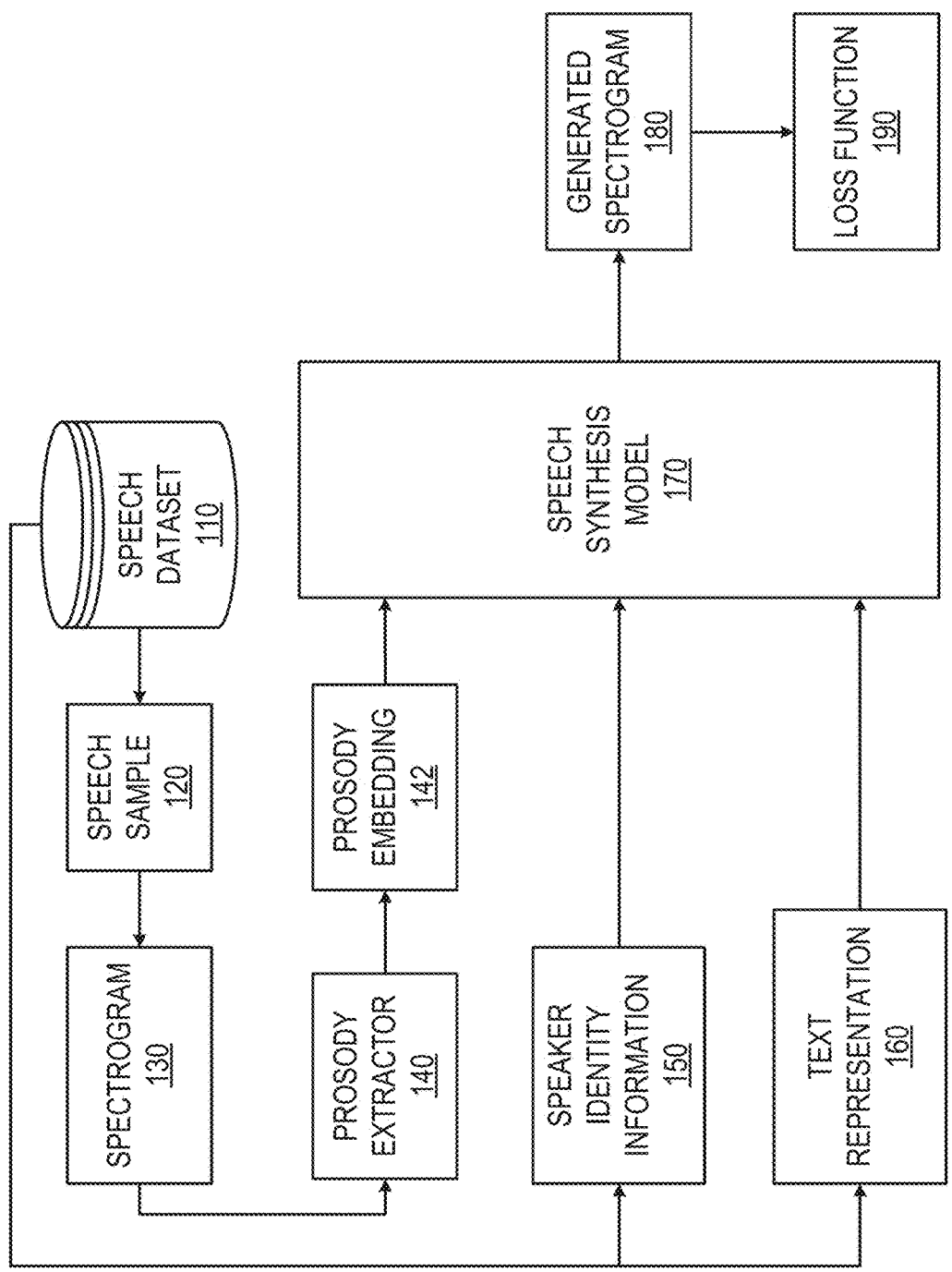
FIG. 1 depicts a system for training a prosody extractor.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

According to embodiments of the invention, some components of the system such as the prosody extractor may include one or more neural networks (NN). NNs are computing systems inspired by biological computing systems, but operating using manufactured digital computing technology. NNs are mathematical models of systems made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning or training proceeds typically using a loss function. The weight increases or decreases the strength of the signal at a connection. Typically, NN neurons or nodes are divided or arranged into layers, where different layers can perform different kinds of transformations on their inputs and can have different patterns of connections with other layers. NN systems can learn to perform tasks by considering example input data, generally without being programmed with any task-specific rules, being presented with the correct output for the data, and self-correcting, or learning using a loss function.

Some embodiments of the invention may include other deep architectures such as transformers, that may include series of layers of self-attention mechanisms and feedforward neural networks, used for processing input data. Transformers may be used in light of their capacity of parallelism and their multi-headed self-attention which facilitate features extraction.

Various types of NNs exist. For example, a convolutional neural network (CNN) can be a deep, feed-forward network, which includes one or more convolutional layers, fully connected layers, and/or pooling layers. CNNs are particularly useful for visual applications. Other NNs can include for example time delay neural network (TDNN) which is a multilayer artificial neural network that can be trained with shift-invariance in the coordinate space.

In practice, an NN, or NN learning, may be performed by one or more computing nodes or cores, such as generic central processing units or processors (CPUs, e.g. as embodied in personal computers), graphics processing units (GPUs), or tensor processing units (TPUs). which can be connected by a data network.

The voice or speech sample may be provided in any applicable computerized audio format such as the MP3, MP4, M4A, WAV, etc., formats.

The speech samples and/or spectrograms (e.g., mel spectrograms) of the speech samples may be provided to one or more voice encoders (e.g., NNs) such as a prosody extractor, an automatic speech recognition (ASR) network and a speaker identity extractor that may each generate an embedding, e.g., a latent space vector, also referred to herein simply as a latent vector, a latent matrix, a signature or a feature vector, in a feed forward process, for each of the speech samples. As used herein, an embedding may include a reduced dimension (e.g., compressed) representation of the original data, generated for example by a machine learning (ML) model or an encoder. The embedding may include a vector (e.g., an ordered list of values) or a matrix that represents the original data in a compressed form that, if generated properly, includes important or significant components or characteristics of the raw data.

Figure 10:
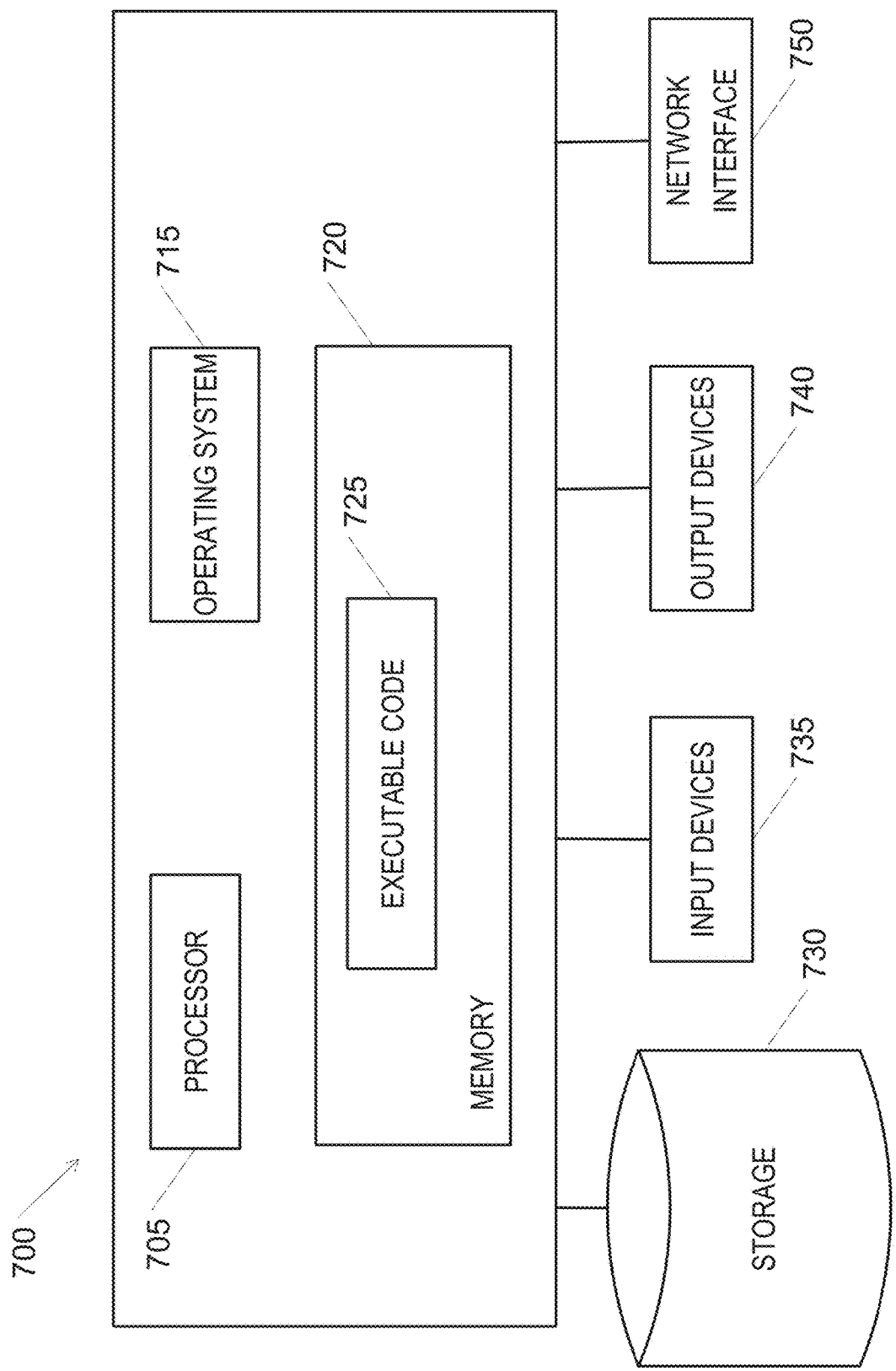
FIG. 10 shows a high-level block diagram of an exemplary computing device which may be used with embodiments of the present invention.

Reference is made to FIG. 1, which depicts a system 100 for training a prosody extractor 140. It should be understood in advance that the components and functions shown in FIG. 1 are intended to be illustrative only and embodiments of the invention are not limited thereto. While in some embodiments of the system of FIG. 1 are implemented using systems as shown in FIG. 10, in other embodiments other systems and equipment can be used.

Speech dataset 110 may include speech samples 120, e.g., an audio recording of speech, where each speech sample 120 is associated with speaker identity information 150 and text representation 160. Speaker identity information 150 may include an identifier (speaker ID), e.g., a name of the specker, an identification number or vector, that is unique per speaker in speech dataset 110. Text representation 160 may include a transcription including a representation of the spoken language in speech sample 120 in written form. Dataset 110 may be stored, for example, on storage 730 presented in FIG. 10.

Prosody extractor 140 may be configured to obtain speech sample 120 or a spectrogram 130 (e.g., a mel spectrogram) of speech sample 120 and to generate, estimate, calculate or extract a prosody embedding 142 from speech sample 120 or the spectrogram 130 of speech sample 120. Prosody extractor 140 may strongly bottleneck speech sample 120 or the spectrogram 130 of speech sample 120 to obtain a reduced dimension representation of speech sample 120 that may presumably represent prosody characteristics of speech sample 120. As used herein, prosody may refer to the rhythm or tempo, stress, pronunciation patterns and intonation of speech.

Speech synthesis model 170 may include an ML model, e.g., an NN, that is configured to generate synthetic speech or a generated spectrogram 180 (e.g., a mel spectrogram) that may be used for generating synthetic speech, based on input data, in this case prosody embedding 142, speaker identity information 150 and text representation 160. Speech synthesis model 170 may include any trainable speech synthesis model or a model that generates spectrograms or mel spectrograms from text. An example of a model that generates mel spectrograms from text includes the Tacotron or Tacotron2 models. The Tacotron or Tacotron 2 models may be followed by a model that generates speech from the mel spectrograms such the WaveGlow model.

Speech synthesis model 170 and prosody extractor 140 may be trained together. For example, during training, a loss function 190 may be calculated, e.g., that measures a distance between spectrogram 130 and generated spectrogram 180 and/or between speech sample 120 and synthetic speech (not shown) generated from generated spectrogram 180. Loss function 190 may be used to adjust weights and parameters of speech synthesis model 170 and prosody extractor 140 in a back propagation mode.

Speech synthesis model 170 and prosody extractor 140 may work in an encoder-decoder mode, in which prosody extractor 140 is the encoder that strongly bottlenecks speech sample 120 or spectrogram 130, and speech synthesis model 170 is the decoder that recreates or reconstructs a speech sample, or generated spectrogram 180 from the reduced dimension prosody embedding 142 generated by prosody extractor 140. However, since speech synthesis model 170 receives, in addition to prosody embedding 142, the speaker identity information 150 and text representation 160, according to the theory of encoder-decoder training, prosody extractor 140 may be optimized in the training process to provide speech synthesis model 170 information that is not included in the speaker identity information 150 and text representation 160, which theoretically should be the prosody of speech sample 120, e.g., the rhythm, stress, and intonation of the speech in speech sample 120.

While, as noted above, prosody may refer to the rhythm, stress, and intonation of speech, in the embodiment of system 100, all characteristics of the speech that are unrelated to the speaker identity and the text spoken in speech sample 120 may be represented in prosody embedding 142. In an ideal or perfect recording of voice, the assumption that prosody embedding 142 represents only prosody of speech sample 120 may be true, e.g., prosody embedding 142 may represent the rhythm, stress, and intonation of speech. However, in real life scenarios, prosody embedding 142 may represent the prosody of speech, as well as other characteristics of speech sample 120 that are not related to prosody, such as effects on the audio quality caused by the recording device used for recording speech sample 120 and by the transmission line used for conveying the audio.

Figure 2:
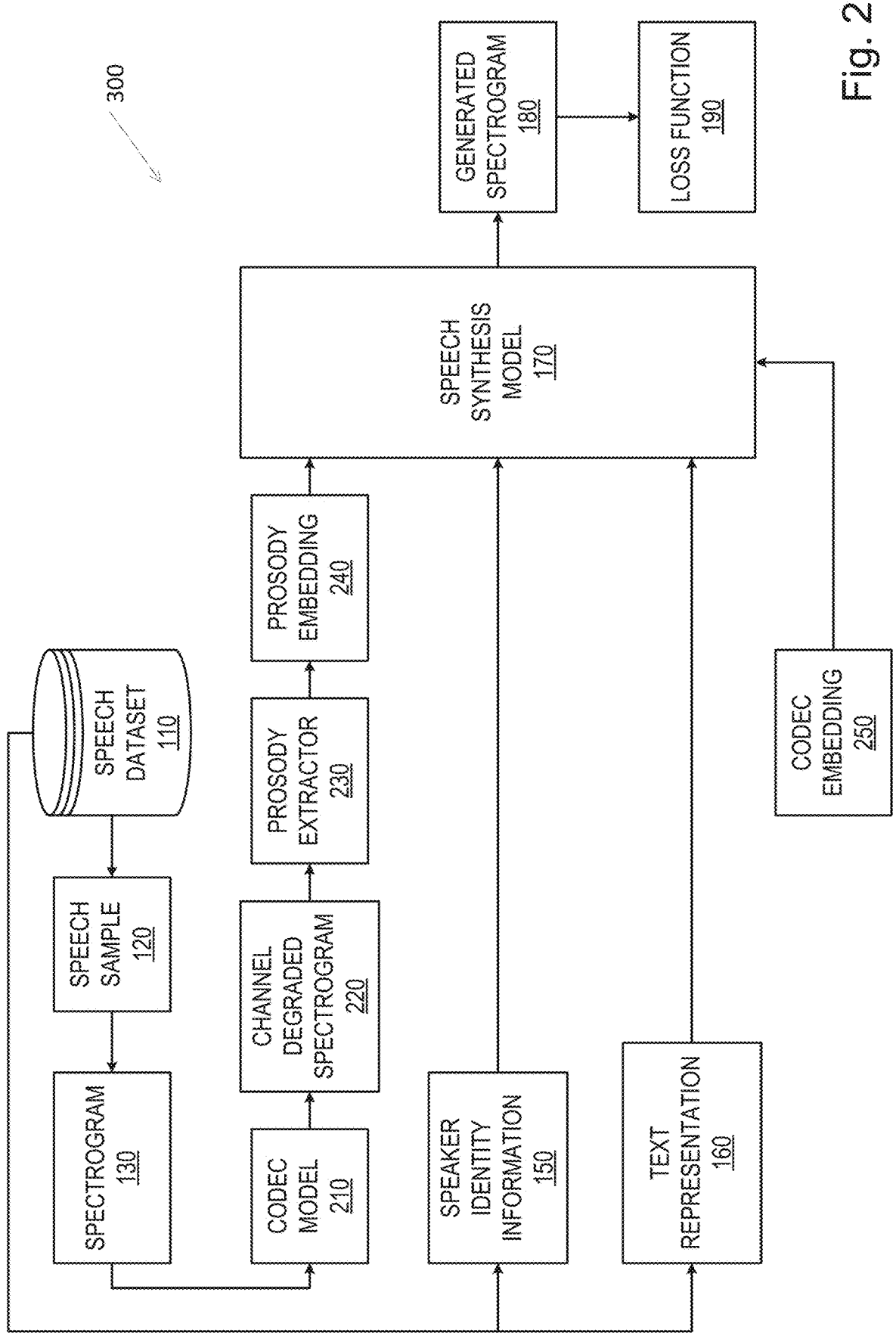
FIG. 2 depicts a system for training a prosody extractor, according to embodiment of the invention.

Reference is made to FIG. 2, which depicts a system 200 for training a prosody extractor 230, according to embodiment of the invention. It should be understood in advance that the components and functions shown in FIG. 2 are intended to be illustrative only and embodiments of the invention are not limited thereto. While some embodiments of the system of FIG. 2 are implemented using systems as shown in FIG. 10, in other embodiments other systems and equipment can be used.

In system 200, spectrogram 130 may be provided to codec model 210. Codec model 210 may include a mathematical model and/or a network such as NN that may be a mathematical representation of the effects of a transmission channel that may be used to transmit a speech sample in real life scenarios on spectrogram 130. In a real-life scenario, a speech sample may be transmitted using a transmission channel that is not ideal, such as a telephone line, a encoder-decoder pair, etc. Each such transmission channel may have a typical frequency response that may degrade the quality of the speech sample in an expectable manner, that can be modeled mathematically by a computerized codec model 210. Thus, codec model 210 may obtain spectrogram 130 and may generate channel degraded spectrogram 220, which is a spectrogram that is degraded as if speech sample 120 has been transferred through a transmission channel represented by codec model 210. In the training process of speech synthesis model 170 and prosody extractor 230, a plurality of types of codec models 210 may be used, each for a different type of transmission channel. Prosody extractor 230 may obtain channel degraded spectrogram 220 and may generate, produce, calculate or extract prosody embedding 240, that may be provided to speech synthesis model 170. In addition to obtaining prosody embedding 240, speech synthesis model 170 may also be provided with codec embedding 250. Codec embedding 250 may be a number or a vector (e.g., an ordered list of numbers) that may represent the type of codec model 210 that is applied to speech sample 120 in a certain training iteration. Thus, each type of codec model 210 may be associated with a unique codec embedding 250, that may be provided to speech synthesis model 170 in training iterations where the associated type of codec model 210 is applied to spectrogram 130.

According to embodiments of the invention, and based on the theory of encoder-decoder training, since data regarding channel degradation may be provided to speech synthesis model 170 in the form of codec embedding 250, prosody extractor 230 may be optimized in the training process to provide speech synthesis model 170 information that is not included in the speaker identity information 150, text representation 160 and codec embedding 250. Thus, according to embodiments of the invention, prosody embedding 240 generated by prosody extractor 230 may be closer to the real speech prosody (e.g., the rhythm, stress, and intonation of the speech in speech sample 120) of speech sample 120 than prosody embedding 142, since prosody embedding 142 may include information regarding the transmission channel and prosody embedding 240 may not.

Figure 3:
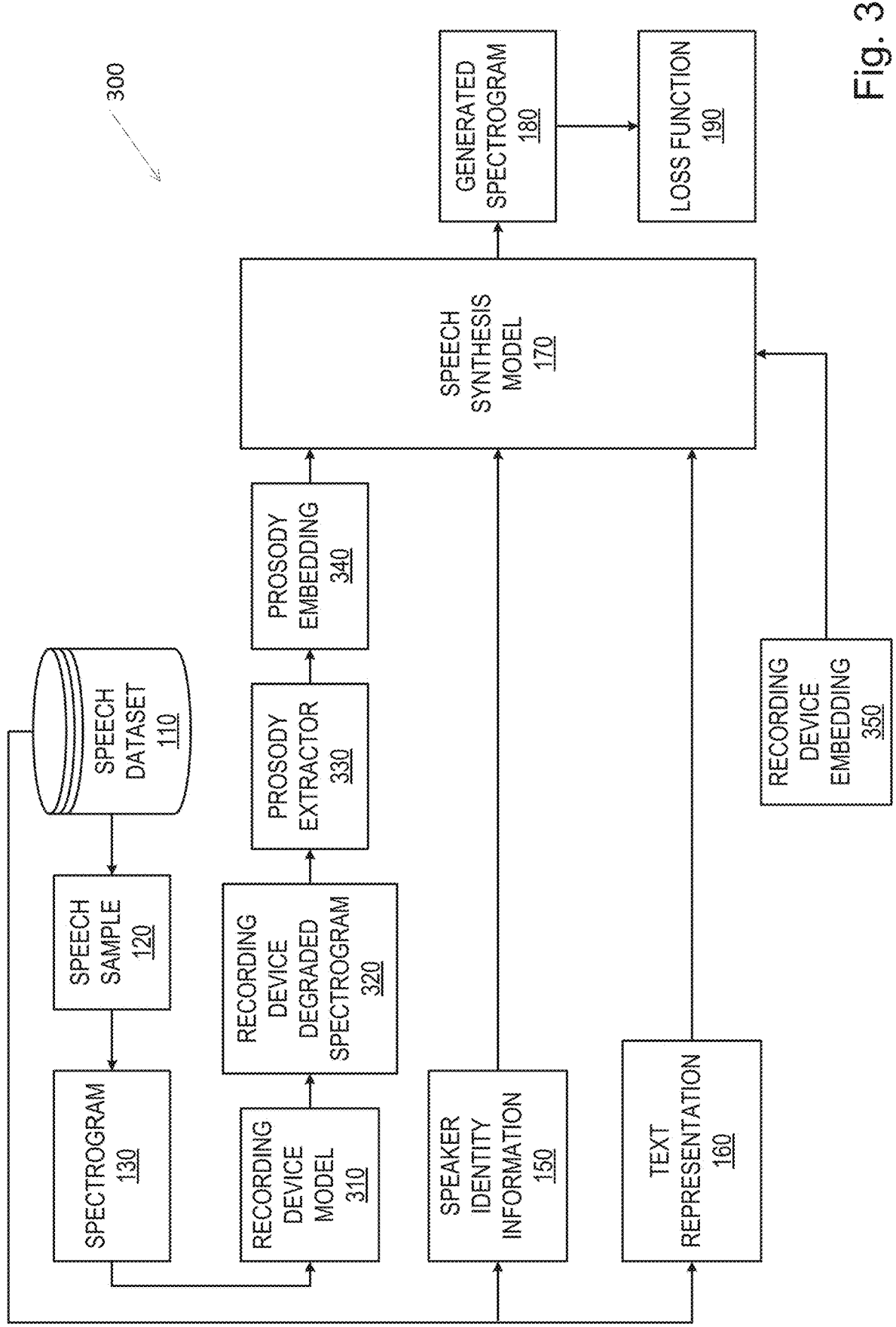
FIG. 3 depicts a system for training a prosody extractor, according to embodiment of the invention.

Reference is made to FIG. 3, which depicts a system 300 for training a prosody extractor 330, according to embodiment of the invention. It should be understood in advance that the components and functions shown in FIG. 3 are intended to be illustrative only and embodiments of the invention are not limited thereto. While in some embodiments of the system of FIG. 3 are implemented using systems as shown in FIG. 10, in other embodiments other systems and equipment can be used.

In system 300, spectrogram 130 may be provided to recording device model 310. Recording device model 310 may include a computerized mathematical model and/or a network such as NN that may be a mathematical representation of the effects of a recording device that may be used for the recording of a speech sample in real life, on spectrogram 130. In a real life scenario, a speech sample may be recorded using a recording device that is not ideal, such as a cellular phone, a line phone, a recording device of a computer, etc. Each such recording device may have a typical frequency response that may degrade the quality of the speech sample in an expectable manner, that can be modeled by recording device model 310. Thus, recording device model 310 may obtain spectrogram 130 and may generate recording device degraded spectrogram 320, which is a spectrogram that is degraded as if speech sample 120 has been recording by a recording device represented by recording device model 310. In the training process of speech synthesis model 170 and prosody extractor 330, a plurality of types of recording device models 310 may be used, each for a different type of recording device. Prosody extractor 330 may obtain recording device degraded spectrogram 320 and may generate, produce, calculate or extract prosody embedding 340, that may be provided to speech synthesis model 170. In addition to obtaining prosody embedding 340, speech synthesis model 170 may also be provided with recording device embedding 350. Recording device embedding 350 may be a number or a vector (e.g., an ordered list of numbers) that may represent the type of recording device model 310 that is applied to speech sample 120 in a certain training iteration. Thus, each type of recording device model 310 may be associated with a unique recording device embedding 350, that may be provided to speech synthesis model 170 in training iterations where the associated type of recording device model 310 is applied to spectrogram 130.

According to embodiments of the invention, and based on the theory of encoder-decoder training, since data regarding the recording device may be provided to speech synthesis model 170 in the form of recording device embedding 350, prosody extractor 330 may be optimized in the training process to provide speech synthesis model 170 information that is not included in the speaker identity information 150, text representation 160 and recording device embedding 350. Thus, according to embodiments of the invention, prosody embedding 340 generated by prosody extractor 330 may be closer to the real speech prosody (e.g., the rhythm, stress, and intonation of the speech in speech sample 120) of speech sample 120 than prosody embedding 142, since prosody embedding 142 may include information regarding the recording device and prosody embedding 340 may not.

Figure 4:
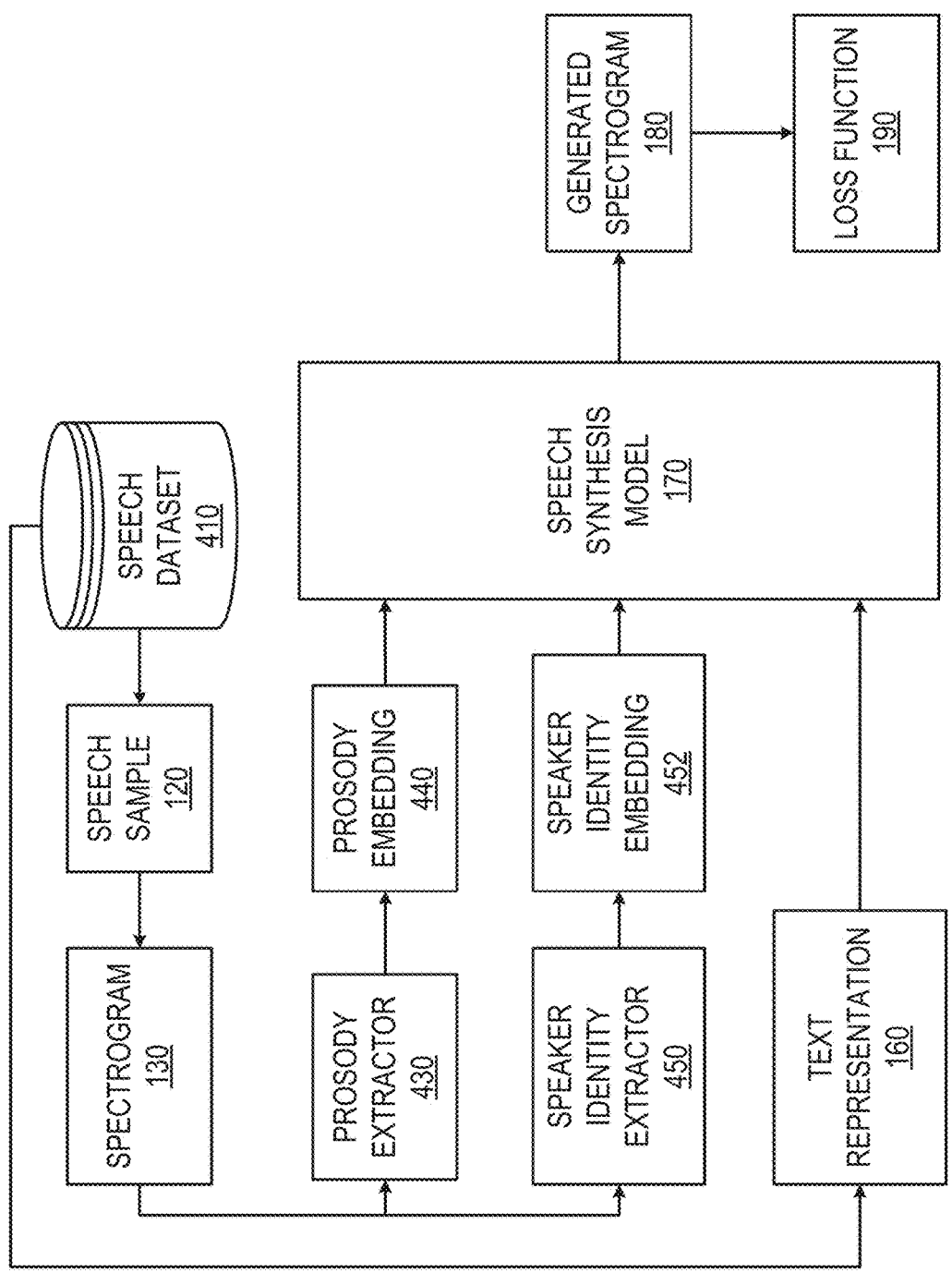
FIG. 4 depicts a system for training a prosody extractor, according to embodiment of the invention.

Reference is made to FIG. 4, which depicts a system 400 for training a prosody extractor 430, according to embodiment of the invention. It should be understood in advance that the components and functions shown in FIG. 4 are intended to be illustrative only and embodiments of the invention are not limited thereto. While in some embodiments of the system of FIG. 4 are implemented using systems as shown in FIG. 10, in other embodiments other systems and equipment can be used.

In system 400, the speaker identity information may be generated by providing speech sample 120, or spectrogram 130 (that is calculated from speech sample 120) to a pretrained speaker identity extractor 450, to extract speaker identity embedding 452. Pretrained speaker identity extractor 450 may be any suitable off-the-shelf, proprietary or other ML model, e.g., an NN, pretrained for extracting speaker identity embedding 452, used for example, for applications such as speaker recognition and authentication. According to embodiments of the invention, since speaker identity information, that may be required for every speech sample 120 used for training, may be extracted from speech sample 120 itself, or from spectrogram 130 that is calculated from speech sample 120, speaker identity information may not be provided to speech synthesis model 170 from dataset 410. Thus, dataset 410 may be different from dataset 110, since dataset 110 should include speaker identity information 150 and should provide speaker identity information 150 to speech synthesis model 170. Since the number of datasets 110 that include speaker identity information 150 may be smaller in comparison with the number of datasets 410 that do not include speaker identity information 150, more datasets 410 may be used for training system 400 than datasets 110 used for the training of system 100. Enlarging the amount of training data may significantly improve the performance of system 400 compared with the performance of system 100, e.g., by improving the training process and by this providing a higher quality prosody extractor 430.

Figure 5:
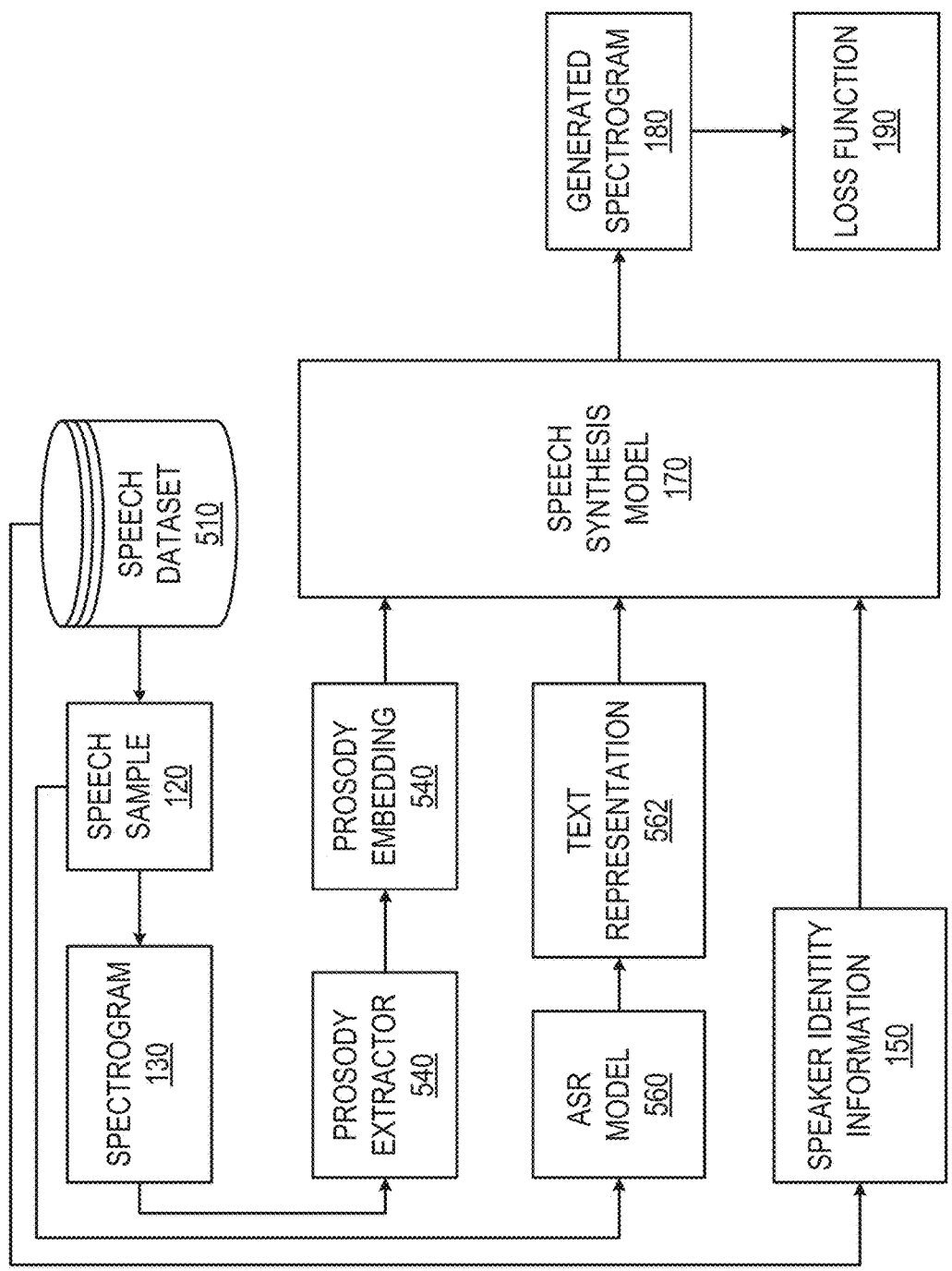
FIG. 5 depicts a system for training a prosody extractor, according to embodiment of the invention.

Reference is made to FIG. 5, which depicts a system 500 for training a prosody extractor 540, according to embodiment of the invention. It should be understood in advance that the components and functions shown in FIG. 5 are intended to be illustrative only and embodiments of the invention are not limited thereto. While in some embodiments of the system of FIG. 5 are implemented using systems as shown in FIG. 10, in other embodiments other systems and equipment can be used.

In system 500, text representation 562 may be generated by providing speech sample 120, to a pretrained ASR model 560, that may output or extract text representation 562. Pretrained ASR model 560 may be any off-the-shelf, proprietary or other ML model, e.g., an NN, pretrained for extracting text representation 562, used for example, for applications such as speech to text conversion. In some embodiments, text representation 562 may not include the text itself, but an intermediate stage data used in text to speech conversion such as a sequence of vector representations of pieces of phonemes in the training speech sample, e.g., in some embodiments ASR model 560 may include a wav2vec (W2V) model (e.g., a NN or a CNN that may obtain speech recording as input and compute a vectorial representation that can be input to other networks of a speech recognition system) and text representation 562 may include a sequence of W2V vectors. Other ASR models and text representations may be used. According to embodiments of the invention, since text representation 562 may be extracted from speech sample 120, text representation 160 may not be provided to speech synthesis model 170 from dataset 510. Thus, dataset 510 may be different from dataset 110, since dataset 110 should include text representation 160 and should provide text representation 160 to speech synthesis model 170. Since the number of datasets 110 that include text representation 160 may be smaller in comparison to the number of datasets 510 that do not include text representation 160, more datasets 510 may be used for training system 500 than datasets 110 used for the training of system 100. Enlarging the amount of training data may significantly improve the performance of system 500 compared with the performance of system 100, e.g., by improving the training process and by this providing a higher quality prosody extractor 530. In addition, in case the actual text is provided to speech synthesis model 170, system 100 has to translate the text back to a vectorial representation, such as W2V vectors or similar vectors. Thus, providing W2V vectors instead of the actual text may eliminate the stage of translation and by this simplify information flow of the training process and provide more efficient training.

Figure 6:
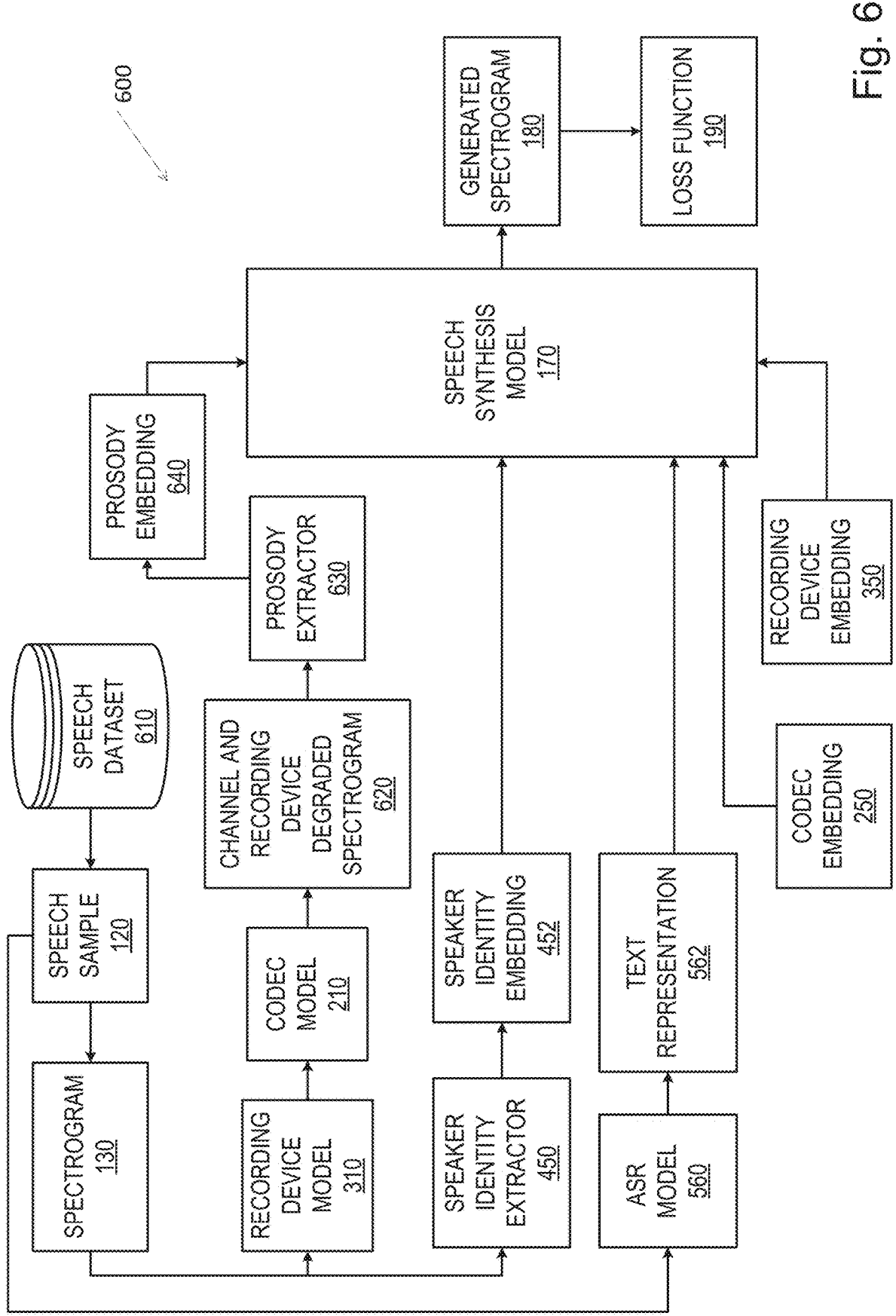
FIG. 6 depicts a system for training a prosody extractor, according to embodiment of the invention.

While each of systems 200-500 presents an improvement over system 100, embodiments of systems may be combined together, to provide even larger improvements. System 600 presented in FIG. 6 presents a combination of features of systems 200-500. While system 600 provides excellent performances, other combinations may be made.

Reference is made to FIG. 6, which depicts a system 600 for training a prosody extractor 630, according to embodiment of the invention. It should be understood in advance that the components and functions shown in FIG. 6 are intended to be illustrative only and embodiments of the invention are not limited thereto. While in some embodiments of the system of FIG. 6 are implemented using systems as shown in FIG. 10, in other embodiments other systems and equipment can be used.

In system 600, spectrogram 130 may be provided to recording device model 310, similarly to system 300 presented in FIG. 3 and to codec model 210, similarly to system 200 presented in FIG. 2. Thus, histogram 130 may be degraded by both recording device model 310 and codec model 210 to produce channel and recording device degraded spectrogram 620. The order of recording device model 310 and codec model 210 may be reversed, or a single model representing both the recording device and the transmission may be used. Prosody extractor 630 may obtain channel and recording device degraded spectrogram 620 and may generate, produce, calculate or extract prosody embedding 640, that may be provided to speech synthesis model 170. Similarly to systems 200 and 300, codec embedding 250 and recording device embedding 350 that correspond to codec model 210 and recording device model 310, respectively, may be provided to speech synthesis model 170.

In addition, the speaker identity information may be generated by providing speech sample 120, or spectrogram 130 (that is calculated from speech sample 120) to a pretrained speaker identity extractor 450, to extract speaker identity embedding 452, similarly to system 400 presented in FIG. 4. Finally, text representation 562, including for example a sequence of vector representations of pieces of phonemes such as W2V vectors may be generated by providing speech sample 120, to a pretrained ASR model 560, similarly to system 500 presented in FIG. 5. It follows that dataset 610 may include speech samples only, with no associated speaker identity data or transcription, thus expending even further the amount of training data that may be used by system 600 with relation to all other embodiments presented herein.

Thus, system 600 may combine all the advantages of systems 200-500 described herein and may provide even superior prosody extractor 630.

Figure 7:
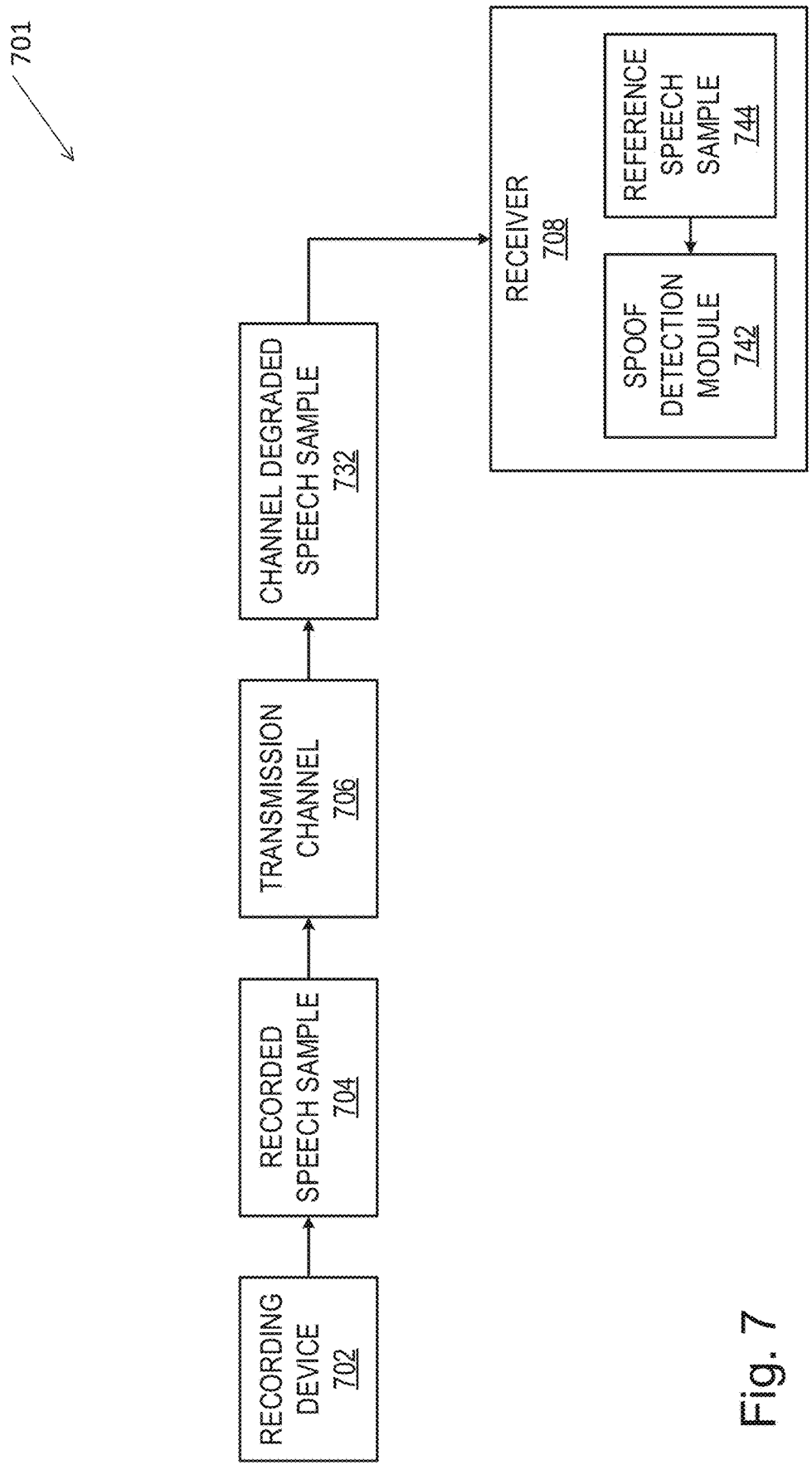
FIG. 7 depicts a system for spoofed voice detecting, according to embodiment of the invention.

Reference is now made to FIG. 7, which is a spoofed voice detection system 701, according to embodiments of the invention. It should be understood in advance that the components and functions shown in FIG. 7 are intended to be illustrative only and embodiments of the invention are not limited thereto. While in some embodiments of the system of FIG. 7 are implemented using systems as shown in FIG. 10, in other embodiments other systems and equipment can be used.

A recording device 702 e.g., a cellular phone, a line phone, a recording device of a computer, etc., may record recorded speech sample 704 (e.g., an audio sample that has not been verified yet) of a speaker. Recorded speech sample 704 may be transmitted to receiver 708 through a transmission channel 706 e.g., a telephone line, an encoder-decoder pair transmitting over a network, e.g., the internet, etc. The audio quality of recorded speech sample 704 may be degraded by transmission channel 706. Thus, receiver 708 may obtain channel degraded speech sample 732, which may be recorded speech sample 704 after being transmitted through transmission channel 706; e.g. channel degraded speech sample 732 may be a degraded version of recorded speech sample 704. Receiver 708 may include any receiving side that may check the authenticity of speech samples using spoof detection module 742. Receiver 708 may be located, for example, at a call center of an organization, etc. Receiver 708 may store reference speech sample 744, that may be recorded, for example, at an enrolment stage. Thus, a reference speech sample 744 of legitimate users may be recorded and stored at receiver 708. Spoof detection module 742 may validate recorded speech sample 704-2 against reference speech sample 744 of the same speaker, using for example a prosody extractor such as prosody extractors 230, 330, 430, 530 and 630.

Figure 8:
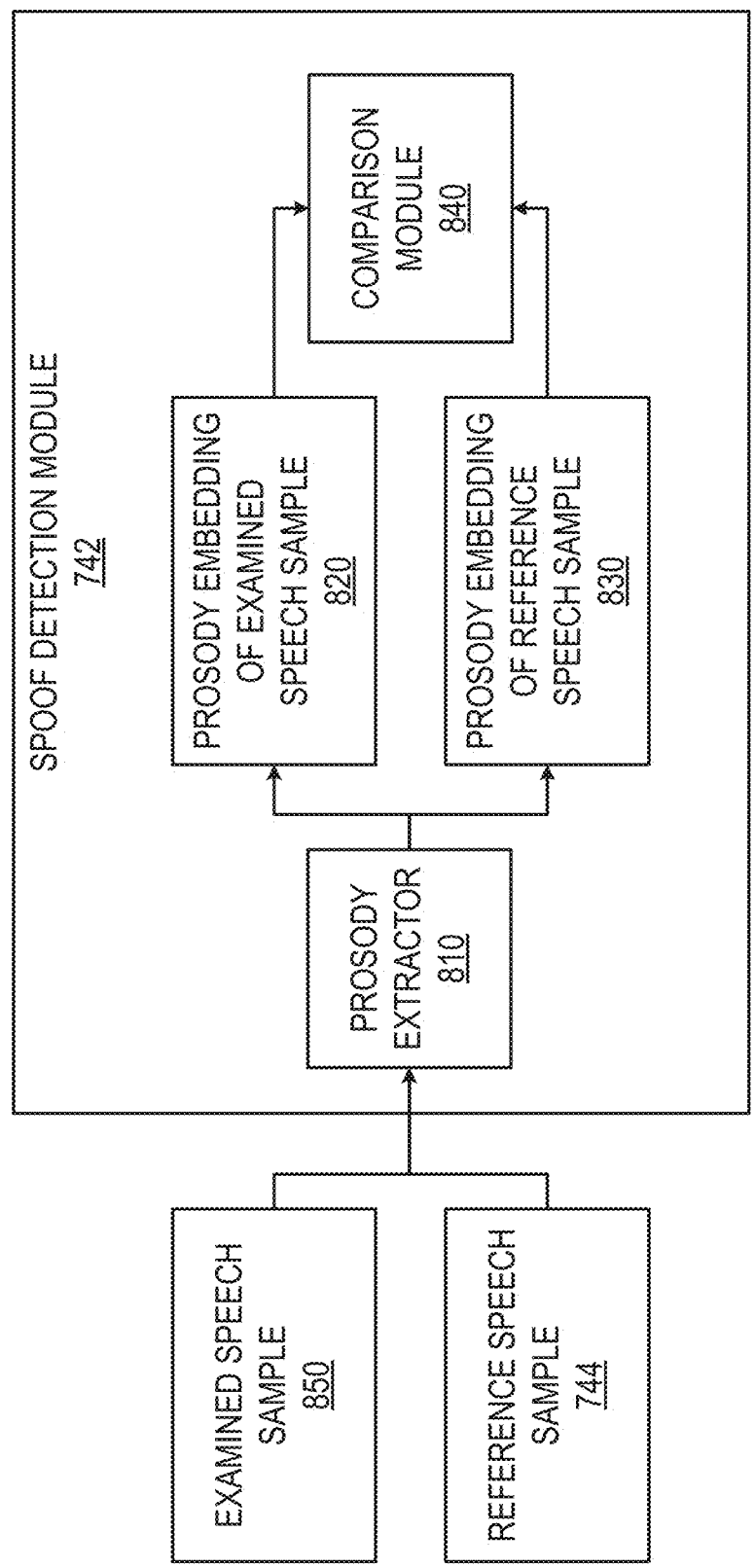
FIG. 8 is a spoofed voice detection module, according to embodiments of the invention.

Reference is now made to FIG. 8, which is a spoofed voice detection module 742-00, according to embodiments of the invention. It should be understood in advance that the components and functions shown in FIG. 8 are intended to be illustrative only and embodiments of the invention are not limited thereto. While in some embodiments of the system of FIG. 8 are implemented using systems as shown in FIG. 10, in other embodiments other systems and equipment can be used.

Spoof detection module 742 may obtain examined speech sample 850 and reference speech sample 744. Examined speech sample 850 may include a recording of a person speaking, e.g., recorded during a call with that person. For example, an organization, a call center or another entity may receive a call, and a certain duration of the caller's speech may be recorded. Examined speech sample 850 may include a legitimate speech recording such as channel degraded speech sample 732, or a synthetic speech impersonating a person, generated, for example, by an artificial intelligence (AI) tool such as a voice generative network. Spoof detection module 742 may provide examined speech sample 850 to prosody extractor 810 to obtain prosody embedding of examined speech sample 820. Spoof detection module 742 may provide reference speech sample 744 to prosody extractor 810 to obtain prosody embedding of reference speech sample 830. Prosody extractor 810 may include any one of prosody extractors 230, 330, 430, 530 and 630 or other prosody extractor. Comparison module 840 may obtain prosody embedding of examined speech sample 820 and prosody embedding of reference speech sample 830, may compare prosody embedding of examined speech sample 820 with prosody embedding of reference speech sample 830, and may determine whether reference speech sample 830 is a legitimate authentic speech or not based on the comparison. For example, comparison module 840 may calculate a similarity measure, such as cosine similarity or the reciprocal of the Euclidean distance, between prosody embedding of examined speech sample 820 and prosody embedding of reference speech sample 830, and validate or compare the measure of similarity against a threshold. For example, if the similarity measure is above a threshold comparison module 840 may determine that examined speech sample 850 is a legitimate authentic speech; and if the similarity is less than or equal to the threshold comparison module 840 may determine that examined speech sample 850 is a synthetic voice sample, e.g., not a legitimate authentic speech. Other methods may be used, e.g., a classifier may be trained to classify prosody embedding of examined speech samples 820 as legitimate or spoofed. In some embodiments, spoof detection module 742 may perform an action related to dealing with spoofed calls upon detecting or determining that examined speech sample 850 is a synthetic voice sample. For example, spoof detection module 742 may provide a notice to a human user, e.g., a system administrator, indicating that examined speech sample 850 is suspected as being a synthetic voice sample. Spoof detection module 742 may also stop the call in which examined speech sample 850, or initiate further investigations.

Figure 9:
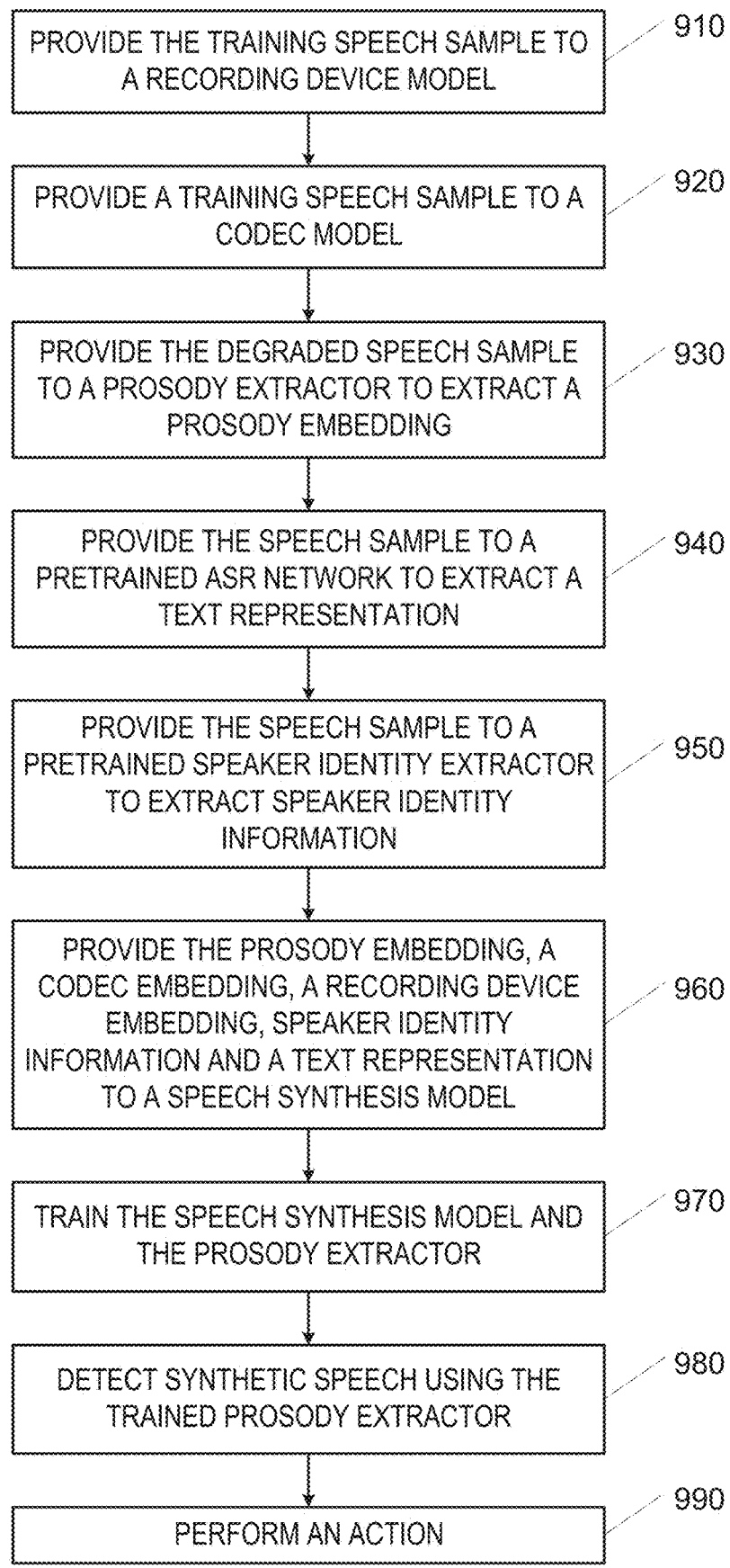
FIG. 9 is a flowchart of a method for training and using a prosody extractor for detecting spoofed voice, according to embodiments of the invention.

Reference is now made to FIG. 9, which is a flowchart of a method for detecting synthetic speech, according to embodiments of the invention. While in some embodiments the operations of FIG. 9 are carried out using systems as shown in FIGS. 1-8 and 10, in other embodiments other systems and equipment can be used.

In operation 910, a processor (e.g., processor 705 depicted in FIG. 10) may provide the training speech sample (e.g., the mel spectrogram of the training speech sample) to a recording device model to generate a recording device degraded speech sample, which is the training speech sample (e.g., the mel spectrogram of the training speech sample) that is degraded as if the training speech sample has been recorded by a recording device represented by the recording device model. In operation 920, the processor may provide the recording device degraded speech sample (e.g., the mel spectrogram of the recording device degraded speech sample) to a codec model. to generate a recording device degraded and channel degraded speech sample, which is the training speech sample (e.g., the mel spectrogram of the training speech sample) that is degraded as if the training speech sample has been recorded by a recording device represented by the recording device model and transferred through a transmission channel represented by the codec model. In some embodiments, one of operations 910 and 920 may be eliminated (e.g., only a single model may be applied), or the order of applying the codec and recording device models may be reversed, or the codec and recording device may both be represented using a single model that that may be applied to the training speech sample.

In operation 930, the processor may provide the degraded speech sample (e.g., the mel spectrogram of the degraded speech sample) to a prosody extractor to generate, produce, calculate or extract a prosody embedding. In case both operations 910 and 920 are omitted, the training speech sample (e.g., the mel spectrogram of the training speech sample) is provided to the prosody extractor.

In operation 940, the processor may provide the speech sample to a pretrained ASR network to extract a text representation of the text included in the training speech sample. The text representation may include the text itself, e.g., a transcript, or a sequence of vector representations of pieces of phonemes in the training speech sample. In some embodiments, the training speech sample may be associated with a transcript and operation 940 may be omitted.

In operation 950, the processor may provide the speech sample to a pretrained speaker identity extractor to extract speaker identity information, e.g., in the form of speaker identity embedding. The pretrained speaker identity extractor may be or may include any off-the-shelf or proprietary ML model, e.g., an NN, pretrained for extracting speaker identity embedding, used for example, for applications such as speaker recognition and authentication.

In operation 960, the processor may provide the prosody embedding, a codec embedding (if operation 920 is not omitted), a recording device embedding (if operation 910 is not omitted), speaker identity information and a text representation to a speech synthesis model. The speech synthesis model may include the Tacotron, Tacotron2 or other speech synthesis model.

In operation 970, the processor may train the speech synthesis model and the prosody extractor. The training may be performed using a loss function defined based on the spectrogram generated by the speech synthesis model compared with a spectrogram of the degraded speech sample (or the spectrogram of the training speech sample if operations 910 and 920 are omitted), e.g., by calculating a difference between the two spectrograms.

In operation 980, the processor may detect synthetic speech using the trained prosody extractor. For example, the processor may obtain (e.g., in a registration or enrolment process) a reference speech sample of a person, and provide the reference speech sample to the trained prosody extractor to generate, produce, calculate or extract a prosody embedding of the reference speech sample. Once an examined speech sample is obtained by the processor, e.g., from a person that is identified as being the same person as in the reference speech sample, the examined speech sample may also be provided to the trained prosody extractor to generate, produce, calculate or extract a prosody embedding of examined speech sample. Next, the processor may compare the prosody embedding of the reference speech sample with the prosody embedding of examined speech sample and determine whether the examined speech sample is authentic or synthetic based on the comparison. The processor may determine whether the examined speech sample is authentic or synthetic based on the comparison by for example calculating a similarity measure between prosody embedding of the examined speech sample and the prosody embedding of the reference speech sample, and validating or comparing the measure of similarity against a threshold. For example, if the similarity measure is above the threshold the processor may determine that examined speech sample is a legitimate authentic speech; and if the similarity is less than or equal to the threshold the processor may determine that examined speech sample is a synthetic voice sample, e.g., not a legitimate authentic speech.

In operation 990 the processor may take an action related to dealing with spoofed calls upon detecting or determining that the examined speech sample is a synthetic voice sample. For example, the processor may provide a notice to a human user, e.g., a system administrator, indicating that the examined speech sample is suspected as being a synthetic voice sample. The processor may also stop the call in which examined speech sample or initiate further investigations.

FIG. 10 shows a high-level block diagram of an exemplary computing device which may be used with embodiments of the present invention. Computing device 700 may include a controller or processor 705 that may be or include, for example, one or more CPUs, GPUs, TPUs and/or a chip or any suitable computing or computational device, an operating system 715, a memory 720, a storage 730, input devices 735 and output devices 740. Each of modules and equipment such as prosody extractors 230, 330, 430, 530 and 630 shown in FIGS. 2-6, respectively, or other modules described herein, may be executed by, a computing device such as included in FIG. 10 or specific components of FIG. 10, although various units among these entities may be combined into one computing device.

Operating system 715 may be or may include any code segment designed and/or configured to perform tasks involving coordination, scheduling, supervising, controlling or otherwise managing operation of computing device 700, for example, scheduling execution of programs. Memory 720 may be or may include, for example, a Random Access Memory (RAM), a read only memory (ROM), a Dynamic RAM (DRAM), a volatile memory, a non-volatile memory, a cache memory, or other suitable memory units or storage units. Memory 720 may be or may include a plurality of possibly different memory units. Memory 720 may store for example, instructions to carry out a method (e.g., code 725), and/or data such as model weights, etc.

Executable code 725 may be any executable code, e.g., an application, a program, a process, task or script. Executable code 725 may be executed by processor 705 possibly under control of operating system 715. For example, executable code 725 may when executed carry out methods according to embodiments of the present invention. For the various modules and functions described herein, one or more computing devices 700 or components of computing device 700 may be used. One or more processor(s) 705 may be configured to carry out embodiments of the present invention by for example executing software or code.

Storage 730 may be or may include, for example, a hard disk drive, a solid-state drive, a floppy disk drive, a Compact Disk (CD) drive, or other suitable removable and/or fixed storage unit. Data such as instructions, code, facial images, voice samples, training data, model weights and parameters etc. may be stored in a storage 730 and may be loaded from storage 730 into a memory 720 where it may be processed by processor 705. Some of the components shown in FIG. 10 may be omitted.

Input devices 735 may be or may include for example a mouse, a keyboard, a touch screen or pad or any suitable input device. Any suitable number of input devices may be operatively connected to computing device 700 as shown by block 735. Output devices 740 may include displays, speakers and/or any other suitable output devices. Any suitable number of output devices may be operatively connected to computing device 700 as shown by block 740. Any applicable input/output (I/O) devices may be connected to computing device 700, for example, a modem, printer or facsimile machine, a universal serial bus (USB) device or external hard drive may be included in input devices 735 or output devices 740. Network interface 750 may enable device 700 to communicate with one or more other computers or networks. For example, network interface 750 may include a wired or wireless NIC.

Embodiments of the invention may include one or more article(s) (e.g. memory 720 or storage 730) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention may be embodied in other specific forms using other details without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein. In some cases well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" can include, for example, "multiple" or "two or more". The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for detecting synthetic speech, the method comprising, using a processor:
    training a prosody extractor comprising a first neural network by:
    generating a channel degraded speech sample by providing a training speech sample to an encoder-decoder (codec) model, wherein the codec model comprises a second neural network that represents effects of a transmission channel on the speech sample, and wherein the channel degraded speech sample comprises a spectrogram that is degraded as if the training speech sample has been transferred through the transmission channel represented by the codec model;
    generating a prosody embedding by providing the channel degraded speech sample to a prosody extractor;
    generating a spectrogram of the training speech sample by providing to a speech synthesis model the prosody embedding, a codec embedding representing the codec model, speaker identity information and a text representation, wherein the speech synthesis model comprises a third neural network;
    training the speech synthesis model and the prosody extractor using a loss function defined based on the spectrogram generated by the speech synthesis model compared with a spectrogram of the channel degraded speech sample;
    receiving an examined speech sample;
    determining whether the examined speech sample includes synthetic speech using the trained prosody extractor; and
    providing a notice in case the examined speech sample is determined to include synthetic speech, wherein the notice comprises an indication that the examined speech sample is suspected as being a synthetic voice sample.

2. The method of claim 1, wherein using the trained prosody extractor to determine whether the examined speech sample includes synthetic speech comprises:
    providing a reference speech sample to the trained prosody extractor to generate a prosody embedding of the reference speech sample;
    providing an examined speech sample to the trained prosody extractor to generate a prosody embedding of examined speech sample;
    comparing the prosody embedding of the reference speech sample with the prosody embedding of examined speech sample; and
    determining whether the examined speech sample is authentic or synthetic based on the comparison.

3. The method of claim 2, wherein determining whether the examined speech sample is authentic or synthetic based on the comparison comprises:
    calculating a similarity measure between prosody embedding of the examined speech sample and the prosody embedding of the reference speech sample; and
    validating the measure of similarity against a threshold.

4. The method of claim 1, comprising generating the text representation by:
    providing the speech sample to a pretrained automatic speech recognition (ASR) network to output the text representation.

5. The method of claim 4, wherein the text representation comprises a sequence of vector representations of pieces of phonemes in the training speech sample.

6. The method of claim 1, comprising generating the speaker identity information by providing the speech sample to a pretrained speaker identity extractor to extract speaker identity embedding, wherein the speaker identity information is the speaker identity embedding.

7. The method of claim 1, wherein providing the channel degraded speech sample to the prosody extractor comprises providing the channel degraded speech sample to a recording device model to generate a channel and recording device degraded speech sample, and providing the channel and recording device degraded speech sample to the prosody extractor; and wherein training the prosody extractor comprises providing a recording device embedding representing the recording device to the speech synthesis model with the prosody embedding, the speaker identity embedding and the text representation for generating the spectrogram of the training speech sample.

8. The method of claim 1, wherein the speech synthesis model is Tacotron2 model.

9. A method for detecting synthetic speech, the method comprising, using a processor:
training a prosody extractor comprising a first neural network by:
generating a recording device degraded speech sample by providing a training speech sample to a recording device model, wherein the recording device model comprises a second neural network that represents effects of a recording device on the speech sample, and wherein the recording device degraded speech sample comprises a spectrogram that is degraded as if the training speech sample has been recorded by the recording device represented by the codec model;
generating a prosody embedding by providing the recording device degraded speech sample to a prosody extractor;
generating a spectrogram of the training speech sample by providing to a speech synthesis model the prosody embedding, a recording device embedding representing the recording device model, speaker identity information and a text representation, wherein the speech synthesis model comprises a third neural network; and
training the speech synthesis model and the prosody extractor using a loss function defined on the spectrogram generated by the speech synthesis model compared with a spectrogram of the channel degraded speech sample;
receiving an examined speech sample;
determining whether the examined speech sample includes synthetic speech using the trained prosody extractor; and
providing a notice in case the examined speech sample is determined to include synthetic speech, wherein the notice comprises an indication that the examined speech sample is suspected as being a synthetic voice sample.

10. The method of claim 9, wherein using the trained prosody extractor to determine whether the examined speech sample includes synthetic speech comprises:
providing a reference speech sample to the trained prosody extractor to generate a prosody embedding of the reference speech sample;
providing an examined speech sample to the trained prosody extractor to generate a prosody embedding of examined speech sample;
comparing the prosody embedding of the reference speech sample with the prosody embedding of examined speech sample; and
determining whether the examined speech sample is authentic or synthetic based on the comparison.

11. The method of claim 9, comprising generating the text representation by:
providing the speech sample to a pretrained automatic speech recognition (ASR) network to output the text representation.

12. The method of claim 11, wherein the text representation comprises a sequence of vector representations of pieces of phonemes in the training speech sample.

13. The method of claim 9, comprising generating the speaker identity information by providing the speech sample to a pretrained speaker identity extractor to extract speaker identity embedding, wherein the speaker identity information is the speaker identity embedding.

14. A system for detecting synthetic speech, the system comprising:
a memory; and
a processor configured to:
train a prosody extractor comprising a first neural network by:
generating a channel degraded speech sample by providing a training speech sample to an encoder-decoder (codec) model, wherein the codec model comprises a second neural network that represents effects of a transmission channel on the speech sample, and wherein the channel degraded speech sample comprises a spectrogram that is degraded as if the training speech sample has been transferred through the transmission channel represented by the codec model;
generating a prosody embedding by providing the channel degraded speech sample to a prosody extractor;
generate a spectrogram of the training speech sample by providing to a speech synthesis model the prosody embedding, a codec embedding representing the codec model, speaker identity information and a text representation, wherein the speech synthesis model comprises a third neural network; and
train the speech synthesis model and the prosody extractor using a loss function defined on the spectrogram generated by the speech synthesis model compared with a spectrogram of the channel degraded speech sample;
receive an examined speech sample;
determine whether the examined speech sample includes synthetic speech using the trained prosody extractor; and
provide a notice in case the examined speech sample is determined to include synthetic speech, wherein the notice comprises an indication that the examined speech sample is suspected as being a synthetic voice sample.

15. The system of claim 14, wherein the processor is configured to use the trained prosody extractor to determine whether the examined speech sample includes synthetic speech by:
providing a reference speech sample to the trained prosody extractor to generate a prosody embedding of the reference speech sample;
providing an examined speech sample to the trained prosody extractor to generate a prosody embedding of examined speech sample;
comparing the prosody embedding of the reference speech sample with the prosody embedding of examined speech sample; and determining whether the examined speech sample is authentic or synthetic based on the comparison.

16. The system of claim 15, wherein the processor is configured to determine whether the examined speech sample is authentic or synthetic based on the comparison by:
    calculating a similarity measure between prosody embedding of the examined speech sample and the prosody embedding of the reference speech sample; and
    validating the measure of similarity against a threshold.

17. The system of claim 14, wherein the processor is configured to generate the text representation by:
    providing the speech sample to a pretrained automatic speech recognition (ASR) network to output the text representation.

18. The system of claim 17, wherein the text representation comprises a sequence of vector representations of pieces of phonemes in the training speech sample.

19. The system of claim 14, wherein the processor is configured to generate the speaker identity information by providing the speech sample to a pretrained speaker identity extractor to extract speaker identity embedding, wherein the speaker identity information is the speaker identity embedding.

20. The system of claim 14, wherein the processor is configured to provide the channel degraded speech sample to the prosody extractor by providing the channel degraded speech sample to a recording device model to generate a channel and recording device degraded speech sample, and providing the channel and recording device degraded speech sample to the prosody extractor; and wherein the processor is configured to train the prosody extractor by providing a recording device embedding representing the recording device to the speech synthesis model together with the prosody embedding, the speaker identity embedding and the text representation for generating the spectrogram of the training speech sample.

* * * * *